Oct. 1, 1968 R. A. COUTURIER 3,404,219

IN-BAND BREAK-IN SYSTEM

Filed May 20, 1964

INVENTOR,
ROBERT A. COUTURIER

BY: Harry M. Saragovitz, Edward J. Kelly, Herbert Berl & Julian C. Keppler

ATTORNEYS.

United States Patent Office 3,404,219
Patented Oct. 1, 1968

3,404,219
IN-BAND BREAK-IN SYSTEM

Robert A. Couturier, Stamford, Conn., assignor to the United States of America as represented by the Secretary of the Army Filed May 20, 1964, Ser. No. 369,030
3 Claims. (Cl. 178—4.1)

ABSTRACT OF THE DISCLOSURE

A system for interrupting a going transmission on a two-wire voice-frequency telegraph network is disclosed. In a half duplex system only one station can send at a time. For any one of a number of reasons the receiving station may desire to interrupt the sending station. The only means by which the receiving station can break-in is by using the available pair of wires and the allocated band of frequencies. In the disclosed system each communication site is provided with a tone generator and a tone detector. The frequency of the tone from the tone generators is selected to be as far removed as possible from the lowest channel frequency without going outside the allocated frequency band. The detector comprises of a filter, an amplifier, a rectifier, an integrator, and a bistable device, all connected in series to the transmission line. An alarm is connected to the output of the detector. When the receiving station wishes to break-in, the tone generator at the receiving station is turned on. This tone is picked up by the detectors at both sites. The output from each detector actuates its associated alarm and causes the teletypewriters to run open. The system is reset by momentarily closing a reset switch at the sending station.

This invention relates to an in-band break-in system, and more particularly to a system for interrupting a going transmission on a two-wire voice-frequency telegraph network.

In a two-wire telegraph network, the operation is called half duplex if the frequency allocation is just sufficiently wide to allow one channel of communication at a time. Under these conditions, the first station can send to the second station, and the second station can send to the first station; however, the two stations can not send to each other simultaneously.

For any one of a number of reasons the receiving station may desire to interrupt the sending station. In order to break-in on the sending station the receiving station must somehow notify the sending station. The only means by which the receiving station can notify the sending station of its desire to break-in is by using the available link: The metallic pair and the allocated band of frequencies.

Prior to my invention no satisfactory system or device existed for providing break-in on a two-wire voice-frequency telegraph network operating in the half duplex fashion. My invention provides this break-in ability with a minimum number of additional components, and it can be readily incorporated into any existing two-wire telegraph system.

In general terms my invention consists of a tone generator for impressing a tone signal on the line at the receiving site. The frequency of the tone is selected to be as far removed as possible from the lowest channel frequency without going outside the allocated frequency band. At the transmitting end this tone actuates a device called a "break-in detector." The output of the break-in detector operates an alarm, thereby notifying the transmitting operator that the receiving operator wishes to interrupt the transmission.

An object of my invention is to provide a break-in system for a two-wire telegraph network.

Another object of my invention is to provide an in-band break-in system for a two-wire voice frequency telegraph network.

A still further object of my invention is to provide a means for interrupting a going transmission on a two-wire telegraph network.

The above mentioned and other objects will become more apparent from the following detailed description and accompanying drawing in which.

Figure 1:
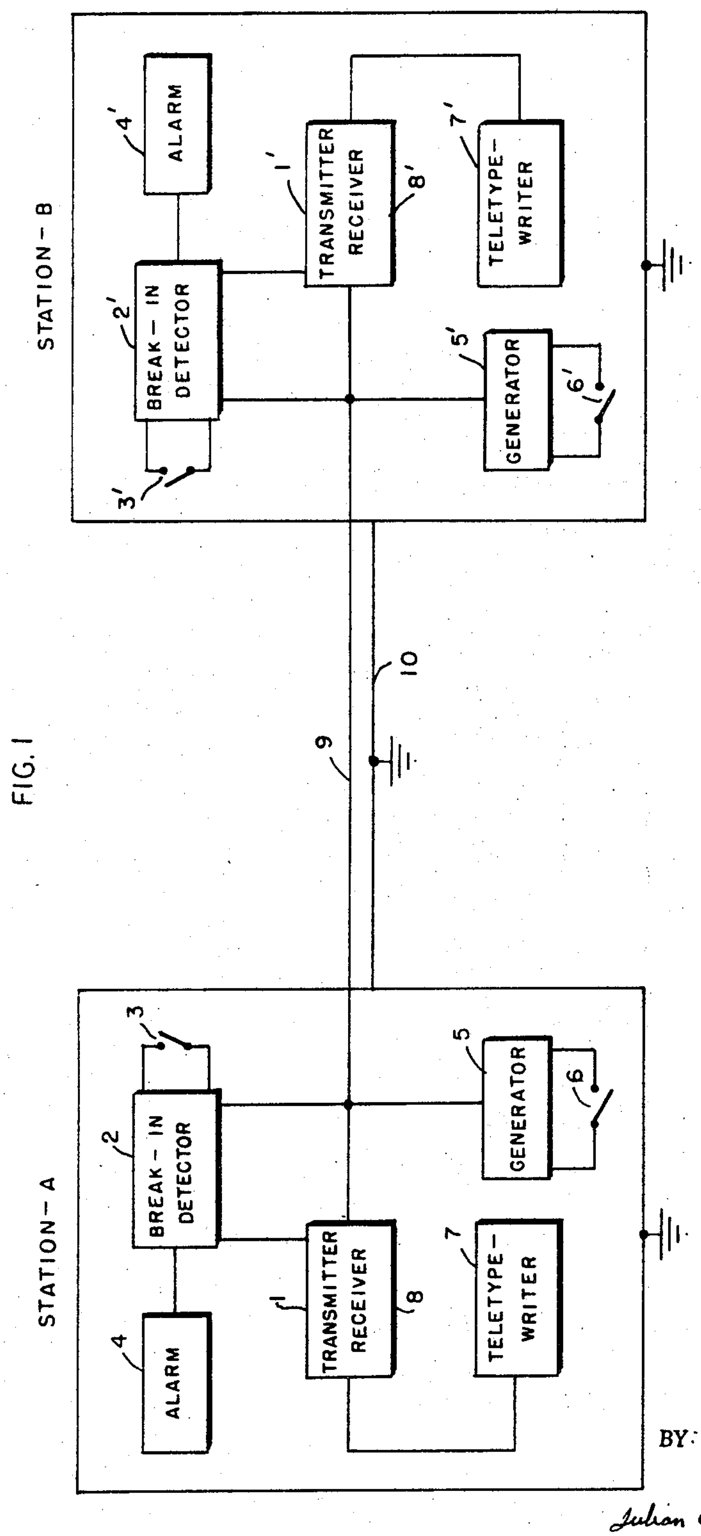
FIG. 1 shows my invention as it is incorporated in a standard telegraph network.

Stations A and B of FIG. 1 are two standard telegraph stations to which my invention has been added. The apparatus contained in both stations is identical, therefore the corresponding parts in each stations are numbered the same, except that the number in station B are primed. Each station contains a transmitter 1, a break-in detector 2, a reset switch 3, an alarm 4, a tone generator 5, a generator on-off switch 6, a teletypewriter 7, and a receiver 8. The two stations are interconnected by lines 9 and 10.

My invention can best be described by assigning specific frequencies to the station A-station B link. In one instance where my invention has been utilized, the center frequency of the allocated band was 1275 c.p.s. The modulation was $\pm 42.5$ c.p.s. Under these conditions the space frequency is 1232.5 c.p.s. and the mark frequency is 1317.5 c.p.s. The frequency of tone generators 5 and 5' must be lower than 1232.5 c.p.s. but still within the allocated bandwith. The allocated bandwidth was such that the lowest frequency available for the tone generators was 1180 c.p.s. After the frequency of the tone generators has been selected, the remaining circuits of my invention must be tuned or designed to respond to this signal only.

After the frequencies of operation have been assigned and appropriate adjustments have been made, the two stations are ready to communicate to each other. Assume that station A is initially the sending station and station B is the receiving station.

The signals from transmitter 1 travel along lines 9 and 10 to receiver 8'. Receiver 8' detects and converts these signals. The output of receiver 8' is applied to teletypewriter 7'. The teletypewriter is, of course, used to obtain a printed copy of the message being transmitted by station A.

The modulation of transmitter 1 by teletypewriter 7 produces sidebands; one of which has a frequency of 1195 c.p.s. For reasons that will become apparent later in this discussion, the 1195 c.p.s. signal must be suppressed within the transmitter. All modern telegraph transmitters contain a transmit filter that suppresses all the sidebands, therefore these signals appear as very weak signals at the output of the transmitter.

The operation thus far described is standard for a two station telegraph network. My invention has been utilized with a system similar to this type, the only difference being that the telegraph equipment with which my invention has actually been tested is designed to allow simultaneous transmission of both voice and telegraph. In this type of network the equipment is identical to that shown in FIG. 1 except for an additional filter not shown in FIG. 1. An additional filter is connected in the transmission line at each station. This filter is used solely to allow simultaneous transmission of both voice and telegraph and forms no part of my invention. It is mentioned here only to show that my invention can also be used with this type of operation. Under these conditions the transmitters and receivers must, of course, be designed to operate on both voice and telegraph.

For any one of a number of reasons station B may wish to interrupt station A before the end of station A's message. This is accomplished as follows: The operator at station B turns on generator 5' by closing switch 6'. Generator 5' produces an 1180 c.p.s. signal that is impressed on the transmission lines. Break-in detector 2 senses this signal and generates an output signal that is used to actuate alarm 4 and is used to cause teletypewriter 7 to run open. Alarm 4 may be any type of indicating means, however an audio alarm is preferable.

While the above described sequence of events takes place at station A, an identical sequence takes place at station B. Detector 2' also senses the output of generator 5', actuates alarm 4', and causes teletypewriter 7' to run open.

The operator at station B needs to close switch 6' only momentarily because the stations will remain in the alarm condition until manually reset. For this reason switches 6 and 6' should be a spring loaded type or similar type that opens automatically when released.

The operator at station A resets the network to normal by temporarily closing reset switch 3. This turns off alarms 4 and 4' and causes teletypewriters 7 and 7' to run closed. The teletypewriters normally run closed.

Figure 2:
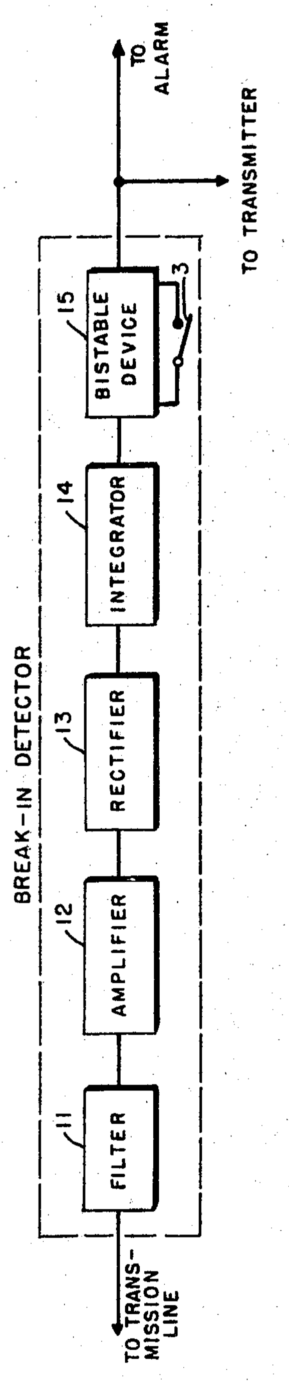
FIG. 2 shows, in detail, a portion of my invention.

The operation of the break-in detector can best be understood by referring to FIG. 2. The break-in detector consists of a filter 11, an amplifier 12, a rectifier 13, an integrator 14, and a bistable device 15. The break-in signal is first applied to filter 11. Filter 11 is a wide bandpass filter that has an extremely sharp skirt beginning at 1180 c.p.s. with a 45 db attenuation between 1180 c.p.s. and 1232 c.p.s. Thus, filter 11 rejects the space frequencies and further attenuates the 1195 c.p.s. sideband. Filter 11 and the above mentioned transmit filter attenuate the 1195 c.p.s. sideband to such a degree that it will not, under normal conditions, actuate the break-in alarm signal.

The output of filter 11 is applied to amplifier 12. This amplifier is necessary to boost the relatively weak break-in signal. The output of amplifier 12 is rectified and then applied to integrator 14. The output of integrator 14 is coupled to bistable device 15. Bistable device 15 can be any circuit that has two stable states.

In the absence of a break-in signal, device 15 remains in the first of its two stable states. In this state no output appears on the lines labelled to alarm and to transmitter. When the output of integrator 14 reaches a predetermined level device 15 is triggered into its second stable state. In this state an output signal is applied to the alarm means and this signal also causes the teletypewriter to run open. Bistable device 15 will remain in its second stable state until it is reset by momentarily closing switch 3.

Under most conditions the above mentioned transmit filter and filter 11 attenuate the sideband signals to such a degree that the break-in detector will detect only the 1180 c.p.s. break-in signal, however since one of the sidebands is only 15 c.p.s. removed from the break-in signal an additional margin of safety against false triggering of the break-in system is desirable. Integrator 14 and bistable device 15 provide this additional margin of safety. As was mentioned above bistable device 15 will not switch to its alarm state unless the output of integrator 14 is above a predetermined level. Integrator 14 is so designed that its output will not reach this predetermined level unless the input signal thereto is present for a relatively long and continuous time. This type of operation is obtained by designing the integrator to have a long integration time constant and a short discharge time constant. With this type of design any signal that attempts to build up a charge must be present at the input of the integrator for a relatively long period of time and must be continuous; any interruption in this time allows the integrator to assume the last lowest input level. The time that the break-in signal is applied to the break-in detector is controlled by the station operator, therefore the break-in signal can be applied for any length of time. Actuation of the local break-in alarm notifies the operator that he has applied the break-in signal for a sufficient period of time. The sideband signals are of a very short duration because they occur only during keying transitions. Thus, the sideband signals cannot produce an integrator output of sufficient magnitude to switch bistable device 15.

From the above description it is apparent that my invention provides a relatively simple and economical means for interrupting a going transmission on a two wire half duplex telegraph system. Furthermore, this break-in is accomplished without going outside the allotted frequency band. With my invention half duplex operation becomes a more desirable and useful method of communication.

It should be understood that the foregoing disclosure relates to a preferred embodiment of my invention and that numerous modifications and alterations may be made therein without departing from the spirit and scope of the invention as set forth in the appended claims.

What is claimed is:

1. An in-band break-in system comprising: first and second telegraph stations interconnected by a pair of metallic lines and operating in a half-duplex fashion, and in-band break-in means included at each of said stations for interrupting the transmission of the other station.

2. An in-band break-in system comprising: a first telegraph station; a second telegraph station remote from said first station; a pair of metallic lines interconnecting said first and second stations; a first break-in signal generator connected to said pair of lines at said first telegraph station; a second break-in signal generator connected to said pair of lines at said second telegraph station; a first break-in signal detector located at said first telegraph station, said first break-in signal detector having a filter connected to said pair of lines, a rectifier, an amplifier connected between said filter and said rectifier, a bi-stable device, and an integrator connected between said bi-stable device and said rectifier; a second break-in detector located at said second telegraph station, said second break-in detector having a filter connected to said pair of lines, rectifier, an amplifier connected between said filter and said rectifier, a bi-stable device, an integrator connected between said bi-stable device and said rectifier; a first audio alarm means connected to said bi-stable device located at said first telegraph station and a second audio alarm means connected to said bi-stable device located at said second station.

3. An in-band break-in system as defined in claim 2 wherein the frequency of said break-in signal generator is within the band of frequencies allocated to said stations but is as far removed from the lowest signal frequency as possible.

References Cited

UNITED STATES PATENTS

| | | | |
|---|---|---|---|
| 2,304,769 | 12/1942 | Nichols et al. | 178—2 |
| 3,076,056 | 1/1963 | Stoffels | 179—3 |
| 3,305,787 | 2/1967 | Distler et al. | 329—104 |

THOMAS A. ROBINSON, *Primary Examiner.*